United States Patent
Yang

(10) Patent No.: US 8,378,604 B2
(45) Date of Patent: Feb. 19, 2013

(54) DC BRUSHLESS MOTOR DRIVE CIRCUIT WITH CURRENT VARIABLE-VOLTAGE

(76) Inventor: Tai-Her Yang, Dzan-Hwa (TW)

( * ) Notice: Subject to any disclaimer, the term of this patent is extended or adjusted under 35 U.S.C. 154(b) by 234 days.

(21) Appl. No.: 12/659,680

(22) Filed: Mar. 17, 2010

(65) Prior Publication Data
US 2011/0227517 A1    Sep. 22, 2011

(51) Int. Cl.
*H02P 27/06* (2006.01)
(52) U.S. Cl. ........... 318/400.3; 318/400.07; 318/400.26; 318/400.38
(58) Field of Classification Search .................. None
See application file for complete search history.

(56) References Cited

U.S. PATENT DOCUMENTS

| | | | | |
|---|---|---|---|---|
| 5,780,983 | A * | 7/1998 | Shinkawa et al. | 318/400.04 |
| 6,443,873 | B2 * | 9/2002 | Suzuki | 482/8 |
| 2001/0036883 | A1 * | 11/2001 | Suzuki | 482/8 |
| 2011/0227516 | A1 * | 9/2011 | Yang | 318/400.3 |
| 2011/0227517 | A1 * | 9/2011 | Yang | 318/400.3 |

* cited by examiner

*Primary Examiner* — Mark Budd
(74) *Attorney, Agent, or Firm* — Bacon & Thomas, PLLC

(57) ABSTRACT

For the present invention, under various running speeds statuses, the voltage supplied to the DC brushless motor is relatively increased or decreased on the basis of the internal setting of the motor drive control device with the increased or decreased load current, to prevent the shortcoming of too much change of the input impedance caused by the inductive reactance of the winding accordingly changed when the speed of the DC brushless motor is changed with the change of the load, specifically, to prevent the shortcoming of unable to produce required torque resulting from the increased inductive reactance of the winding caused by increasing the rotational speed which makes the current value become too low when input by the original working voltage.

8 Claims, 1 Drawing Sheet

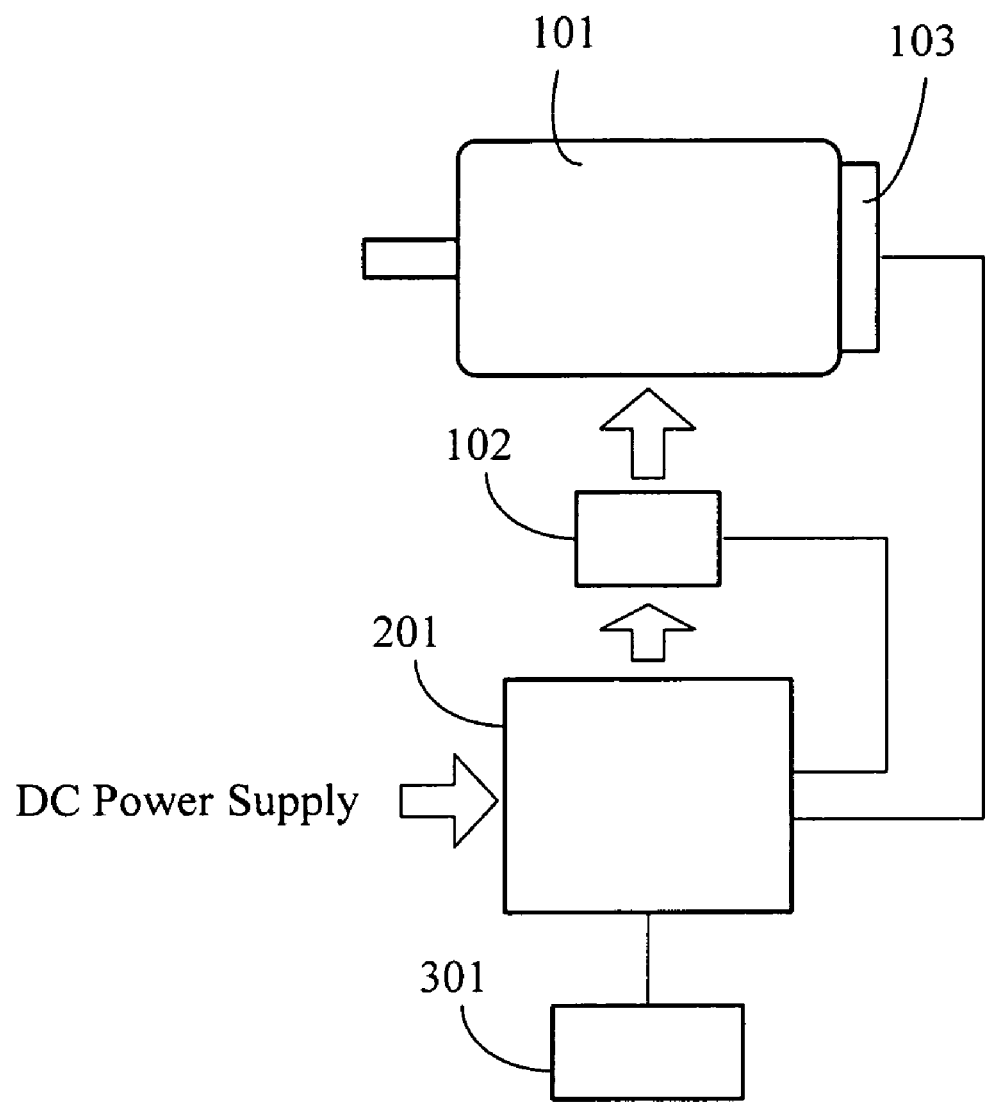

US 8,378,604 B2

DC BRUSHLESS MOTOR DRIVE CIRCUIT WITH CURRENT VARIABLE-VOLTAGE

BACKGROUND OF THE INVENTION (a) Field of the Invention

For the DC brushless motor drive circuit with current variable-voltage of the present invention, in which, under various running speeds statuses, the voltage supplied to the DC brushless motor is relatively increased or decreased on the basis of the internal setting of the motor drive control device according to the increased or decreased load current, so as to prevent the shortcoming of too much change of the input impedance caused by the inductive reactance of the winding accordingly changed when the speed of the DC brushless motor is changed with the change of the load, specifically, to prevent the shortcoming of unable to produce required torque resulting from the increased inductive reactance of the winding caused by increasing the rotational speed which makes the current value become too low when input by the original working voltage.

(b) Description of the Prior Art

The DC brushless motor is usually equipped with the electric machinery angle position detection unit, to detect the variation of the relative electric machinery angle position, during revolution, between the first electric machinery structure constituted by the magnetic field winding and the magnetic circuit, and the second electric machinery structure constituted by the permanent magnetic pole or the winding excitation type magnetic pole, in which the excitation sequence of the magnetic field winding or the excitation polarity of the magnetic field winding is switched by the motor drive control device, and the inductive reactance of the winding is accordingly increased or decreased with the fast or slow speed when the excitation sequence or the excitation polarity of the magnetic field winding is changed.

Therefore, the following shortcoming exists, when the DC voltage input to the DC brushless motor is higher, and the speed of the electric machinery is accordingly faster, if the driven load is increased, because the inductive reactance of the electric machinery is too high, the original input voltage is not enough to increase the input excitation current with the increased load, thus the drive torque is not enough.

SUMMARY OF THE INVENTION

The DC brushless motor drive circuit with current variable-voltage of the present invention relates to a drive circuit of the DC brushless motor driven by DC electric power and equipped with the electric machinery angle position detection device, in which the DC brushless motor is under various rotational speeds statuses produced on the basis of the magnitude of the input voltage and the load, through the load current detection device detecting the variation of the current, and the voltage input into the DC brushless motor is relatively increased or decreased according to the internal setting of the motor drive control device; especially, during the running at the range of high rotational speed, through the increased current value detected by the load current detection device to further increase the input voltage of the DC brushless motor according to the setting of the motor drive control device, thereby to overcome the increased inductive impedance of the magnetic field winding resulting from the increased rotational speed of the DC brushless motor by inputting larger current for providing the current of the DC brushless motor to produce required torque.

BRIEF DESCRIPTION OF THE DRAWINGS

FIG. 1 is a schematic view showing the circuit block of the DC brushless motor drive circuit with current variable-voltage, according to the present invention.

DESCRIPTION OF MAIN COMPONENT SYMBOLS (101): DC brushless motor
(102): Motor load current detection device
(103): Motor electric machinery angle position detection device
(201): Motor drive control device
(301): Running operation device

DETAILED DESCRIPTION OF THE PREFERRED EMBODIMENTS

The DC brushless motor drive circuit with current variable-voltage of the present invention relates to a drive circuit of the DC brushless motor driven by DC electric power and equipped with the electric machinery angle position detection device, in which the DC brushless motor is under various rotational speeds statuses produced on the basis of the magnitude of the input voltage and the load, through the load current detection device detecting the variation of the current, and the voltage input into the DC brushless motor is relatively increased or decreased according to the internal setting of the motor drive control device; especially, during the running at the range of high rotational speed, through the increased current value detected by the load current detection device to further increase the input voltage of the DC brushless motor according to the setting of the motor drive control device, thereby to overcome the increased inductive impedance of the magnetic field winding resulting from the increased rotational speed of the DC brushless motor by inputting larger current for providing the current of the DC brushless motor to produce required torque.

FIG. 1 is a schematic view showing the circuit block of the DC brushless motor drive circuit with current variable-voltage, according to the present invention, the main components including:

DC brushless motor (101): constituted by the first electric machinery structure composed of the magnetic field winding and the magnetic circuit, and the second electric machinery structure composed of the permanent magnetic pole or the winding excitation type magnetic pole, in which the first electric machinery structure and the second electric machinery structure are driven by the relative revolution through the electric machinery effect between the both, the DC brushless electric machinery is installed with the motor electric machinery angle position detection device (103) for detecting the winding of the first electric machinery structure and the magnetic pole of the second electric machinery structure, and the detected signal is transmitted to the motor drive control device (201) for being the reference of controlling the operation of DC brushless motor (101);

motor load current detection device (102): constituted by the current detection device composed of electromagnetic sensing method or impedance method, for detecting the value of the load current transmitted from the motor drive control device (201) to the DC brushless motor (101);

motor electric machinery angle position detection device (103): constituted by the Hall element with magnetoelectric effect, or electric machinery angle position detection device with photoelectric effect or electromagnetic induction effect, or electromechanical electric machinery angle position detection device, to be installed at the DC brushless motor (101), for being placed between the first electric machinery structure equipped with magnetic field winding and the second electric machinery structure equipped with permanent magnetic pole or winding excitation type magnetic pole, to detect the electric machinery angle position between the magnetic field winding and the permanent magnetic pole or the winding excitation type magnetic pole placed at another electric machinery structure with relative coaxial revolution, in which the signal is transmitted to the motor drive control device (201), for being the reference of controlling the operation of DC brushless motor (101);

motor drive control device (201): constituted by the electromechanical circuit device, and/or the solid state electronic device, and/or the microprocessor and related software, which is a circuit device performing linear or chopper type voltage regulation on DC electric energy; in which, the motor drive control device (201) is arranged for inputting DC power, being controlled by the running operation device (301), and receiving the signals from the motor electric machinery angle position detection device (103) and the motor load current detection device (102), for referring the feedback gain setting of the internal setting of the motor drive control device (201), to implement the control over the excitation phase sequence of magnetic field winding of the DC brushless motor (101), the ON/OFF control, and the control over the excitation voltage, the excitation current, the direction of the excitation current, and the excitation timing through the linear control method or the pulse width modulation method; and running operation device (301): constituted by the operation device including electromechanical or electronic switch, button, adjustable potentiometer, keyboard, and indicator, or constituted by the interface receiving the electric power signal, for controlling the motor drive control device (201), and further controlling the DC brushless motor (101).

For the DC brushless motor drive circuit with current variable-voltage, the motor drive control device (201) and the running operation device (301) can be integrated.

For the DC brushless motor drive circuit with current variable-voltage, the motor drive control device (201) and the running operation device (301) can be individually constituted.

For the DC brushless motor drive circuit with current variable-voltage of the present invention, in which, under various running speeds statuses, the voltage supplied to the DC brushless motor is relatively increased or decreased on the basis of the internal setting of the motor drive control device according to the increased or decreased load current, so as to prevent the shortcoming of too much change of the input impedance caused by the inductive reactance of the winding accordingly changed when the speed of the DC brushless motor is changed, specifically, to prevent the shortcoming that the inductive reactance is increased because of the increased rotational speed, thus, if the original running voltage is input, the current value is too low, and the required torque does not be produced.

The invention claimed is:

1. A DC brushless motor apparatus, comprising:
   a DC brushless motor (101), including:
      a first electrical machinery structure including a magnetic field winding and a magnetic circuit;
      a second electrical machinery structure including a magnetic pole;
      an angle position detecting device (103) for detecting a relative position of the first and second electrical machinery structures as the first electrical machinery structure is driven to rotate relative to the second electrical machinery structure, a detected position signal being transmitted to a motor drive control device (201) to provide a reference for controlling operation of the DC brushless motor (101); and
   a motor load detection device (102) for detecting a value of a load current of the DC brushless motor (101) and outputting a motor load detection signal to the motor drive control device;
   wherein the motor drive control device (201) is arranged to control an input voltage of the DC brushless motor (101) in response to said detected position and motor load detection signals, to an internal feedback gain setting of the motor drive control device (201), and to a running operation device (301) including a user interface, wherein the input voltage varies with the load current such that an increase in input voltage compensates for a decrease in load current resulting from increased inductive reactance of the magnetic field winding as a rotational speed of the DC brushless motor increases.

2. A DC brushless motor assembly as claimed in claim 1, wherein said magnetic pole is one of a permanent magnet pole and a magnetic pole having an excitation winding.

3. A DC brushless motor assembly as claimed in claim 1, wherein said motor load current detection device (102) includes one of an electromagnetic current sensing device and an impedance-type current sensing device.

4. A DC brushless motor assembly as claimed in claim 1, wherein said angle position detection device (103) includes one of a Hall element, a photoelectric detection device, an electromagnetic induction device, and an electromechanical position detection device.

5. A DC brushless motor assembly as claimed in claim 1, wherein said motor drive control device (201) includes at least one of an electromechanical circuit device, a solid state electronic device, a microprocessor installed with software, and a circuit device that performs linear or pulse width modulation chopper-type voltage regulation.

6. A DC brushless motor assembly as claimed in claim 1, wherein the running operation device (301) including at least one of an electromechanical switch, an electronic switch, a button, an adjustable potentiometer, a keyboard, and an indicator.

7. A DC brushless motor assembly as claimed in claim 1, wherein the motor drive control device (201) and running operation device (301) are integrated.

8. A DC brushless motor assembly as claimed in claim 1, wherein the motor drive control device (201) and running operation device (301) are separate devices.

* * * * *